United States Patent
Dewa

(10) Patent No.: US 7,218,439 B2
(45) Date of Patent: May 15, 2007

(54) APPARATUS AND METHOD FOR ADJUSTING THE RESONANT FREQUENCY OF AN OSCILLATING DEVICE

(75) Inventor: Andrew S Dewa, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 11/229,480

(22) Filed: Sep. 16, 2005

(65) Prior Publication Data

US 2007/0064299 A1   Mar. 22, 2007

(51) Int. Cl.
*G02B 26/00* (2006.01)
(52) U.S. Cl. .................................. 359/291; 359/290
(58) Field of Classification Search ................ 359/290, 359/291, 223, 224, 238
See application file for complete search history.

(56) References Cited

U.S. PATENT DOCUMENTS 6,809,412 B1 * 10/2004 Tourino et al. ............. 257/678
2006/0077528 A1 * 4/2006 Floyd ........................ 359/291

FOREIGN PATENT DOCUMENTS

JP         08-313781        * 11/1996

* cited by examiner

*Primary Examiner*—Timothy Thompson
*Assistant Examiner*—Jerry Fang
(74) *Attorney, Agent, or Firm*—William B Kempler; W. James Brady; Frederick J. Telecky, Jr.

(57) ABSTRACT

A method for increasing the resonant frequency of a torsional hinged device having a reduced attaching area between the torsional hinges and the supporting anchors. The resonant frequency is increased by adding a material over the reduced area to stiffen the connection between the torsional hinges and the support anchors.

8 Claims, 3 Drawing Sheets

APPARATUS AND METHOD FOR ADJUSTING THE RESONANT FREQUENCY OF AN OSCILLATING DEVICE

CROSS-REFERENCE TO RELATED APPLICATIONS

This application relates to the following co-pending and commonly assigned patent applications: (TI-60301) Ser. No. 11/228,893, filed herewith, entitled Resonant Oscillating Device Actuator Structure and (TI-60322) Ser. No. 11/228,894, filed herewith, entitled Magnet On Frame Oscillating Device, which applications are hereby incorporated herein by reference.

TECHNICAL FIELD

The present invention relates generally to the field of torsional hinged MEMS (Micro Electro Mechanical Systems) oscillating devices. More particularly, the invention relates to a method of adjusting the resonant frequency of such an oscillating device having a power efficient actuator structure for driving and maintaining oscillations of the torsional hinged device.

BACKGROUND

The use of rotating polygon scanning mirrors in laser printers to provide a beam sweep or scan of the image of a modulated light source across a photoresisted medium, such as a rotating drum, is well known. More recently, there have been efforts to use a much less expensive flat member with a single reflective surface, such as a MEMS resonant oscillating mirror to provide the scanning beam. Other devices using resonant oscillating members, other than mirrors, may also benefit from this invention. These torsional hinged resonant scanning devices provide excellent performance at a very advantageous cost. However, every new technology has its own set of problems and resonant torsional hinged devices, such as mirrors, are no exception.

As an example, inertially driven torsional hinged resonant devices made of silicon exhibit unusually high mechanical gain. Further, such resonant devices can readily be driven inertially through the support or anchor regions. However, as will be appreciated by those skilled in the art, the power required to drive the device to a required angular position is a function of the stiffness of the torsional hinges at the anchor regions that support the device and stiffness of the anchor region. Therefore, as customers demand larger mirrors or other oscillating devices with higher and higher resonant frequencies, the torsional hinges must be made stiffer. Typically, the greatest portion of the actuator or drive power is used to bend the anchor regions to provide the rotational motion at the hinge attachment regions of the anchor. Since a favored source of power for an inertial drive is a piezoelectric element, it will be appreciated that as greater drive power is required, greater drive voltages are also required to drive the piezoelectric element. For battery powered applications, such high voltage requirements are a problem.

Therefore, method and structures that facilitate the use of high frequency large resonant devices with a large angular movement without a corresponding increase in drive power would be advantageous.

As will also be appreciated, the resonant frequency of such an oscillating device cannot be precisely set by manufacturing methods. Consequently, a method of adjusting the resonant frequency would be a significant improvement and would improve yield.

SUMMARY OF THE INVENTION

These and other problems are generally solved or circumvented and technical advantages are generally achieved by embodiments of the present invention, which provides a torsional hinged anchor or mounting structure such as a mirror that is power efficient. The structure comprises a pair of torsional hinges that support a resonant member or device such as a mirror that oscillates around a pivot axis. Each hinge of the pair of torsional have a first end connected to the resonant device or mirror, and a second end connected one each to a first or second anchor member (i.e., first and second). The first and second anchor members each have a selected thickness and include a central portion that is connected to a respective torsional hinge and also include at least one mounting portion that is attached to a support structure. The central portion and the mounting portions are joined by a connecting region having a reduced stiffness. The reduced stiffness may be achieved by reducing the cross-sectional area of the connecting region. According to one embodiment, the connecting region compresses a thinned area or trench. The resonant frequency of the device can be increased to a selected value, by applying a material such as solder or a UV curable adhesive over the thermal areas to stiffen the connection between the torsional hinges and the oscillating member. According to a preferred embodiment, the resonant device is made of silicon.

The foregoing has outlined rather broadly the features and technical advantages of the present invention in order that the detailed description of the invention that follows may be better understood. Additional features and advantages of the invention will be described hereinafter, which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

Figure 1A:
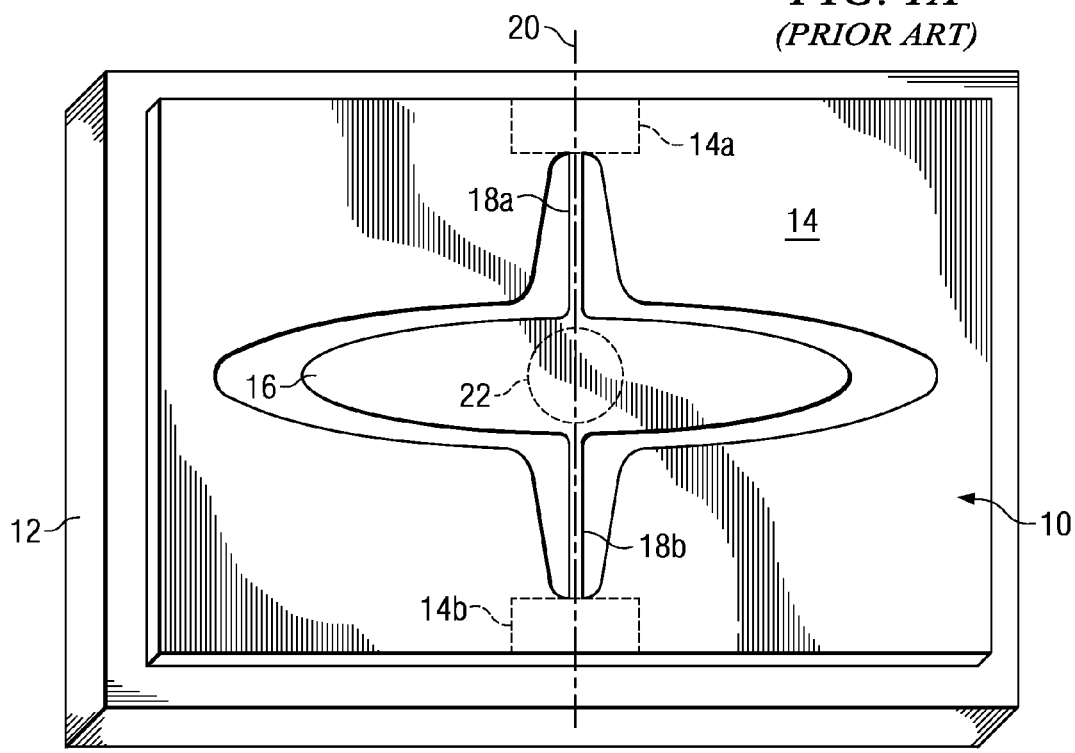
FIGS. 1A and 1B illustrate various types of prior art torsional hinged mirrors that can benefit from the teachings of the present invention.
Figure 1B:
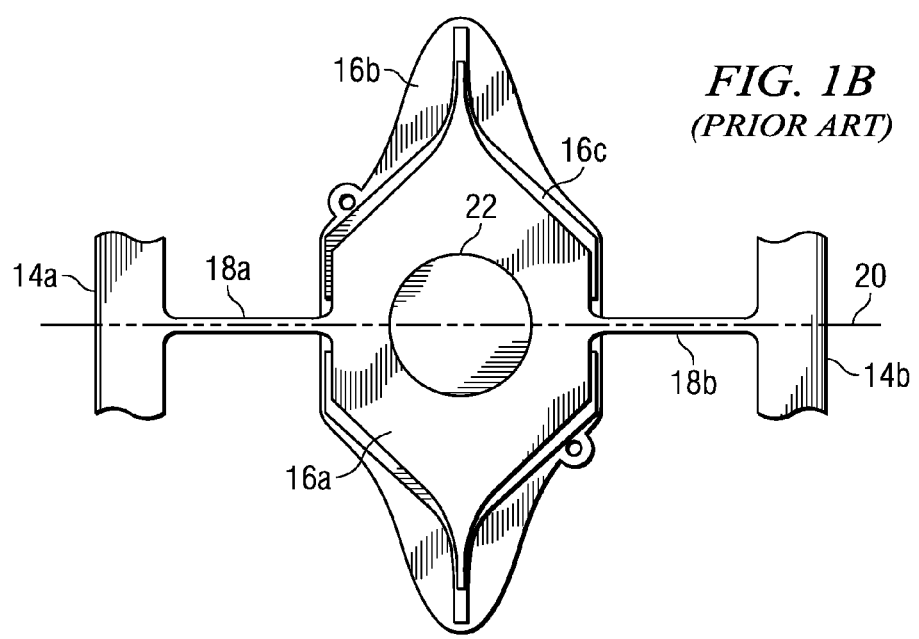

Referring now to FIGS. 1A and 1B, the two types of prior art torsional hinged mirrors will be discussed. The selected and illustrated mirrors are examples only and are in no way intended as limitations on the types of torsional hinged mirrors may advantageously benefit from the present invention. FIG. 1A is a single axis single layer mirror device 10 and includes a structure 12 that supports a frame member 14. An operating surface such as reflecting or mirror surface 16 is in turn supported by a single pair of torsional hinges 18a and 18b that lie along pivoting axis 20. There is also shown a single permanent magnet 22 that could be used for monitoring the angular position of the operating surface if such monitoring is necessary. However, it should be understood that other techniques are available for monitoring the angular position of the mirror, and the permanent magnet may be eliminated. As indicated by dashed lines, anchor pads 14a and 14b may be used to support device 10 rather than a support frame 14.

FIG. 1B is a multilayered single axis mirror. Elements of FIG. 1B common to FIG. 1A and/or each other are labeled with the same reference numbers. More specifically, as is shown in FIG. 1A, the device 10a may also be supported by a frame member 14 or a pair of anchor members 14a and 14b.

The multilayered mirror of FIG. 1B is similar to FIG. 1A, except it includes a hinge layer 16a, a reflecting surface layer 16b, and a truss layer 16c for strengthening the reflecting surface and prevent deformation at resonant speeds. The hinge layer 16c is unitary with the torsional hinges 18a and 18b and is attached to frame 14 or anchors 14a and 14b. The hinge layers are formed or etched from a single piece of silicon. There is also shown a permanent magnet 22 that may be included for monitoring purposes. The multilayered mirror is particularly useful if a magnet 22 is used, as the thickness of the magnet and the truss layer can be designed to assure the mass center of the structure lies on the pivoting axis.

As will be appreciated by those skilled in the art, silicon is an excellent spring material with very low losses. Consequently, the "Q" of the mirror structure made from silicon is very large (on the order of a thousand or greater), and at resonance, there is a mechanical amplification of approximately "Q" times the motion at the anchor regions. However, as the resonant frequency of a resonant scanning mirror is increased and the size (mass moment) of the mirror is also increased, stiffer torsional hinges are required, which in turn requires more actuator or drive power. Resonant scanning mirrors that take advantage of the high mechanical gain at resonance may also be effectively inertially driven through the anchor frame 14 or anchor pads 14a and/or 14b. Piezoelectric inertia drive elements or actuators are an excellent inertia drive source. However, as mentioned above and/or will be appreciated by those skilled in the art, the more drive power required from a piezoelectric element, the higher the drive voltage that is required. For many types of application, this is not a major problem. However, for some applications, and especially for battery driven applications, high voltage requirements may be a serious issue.

The above issue may be addressed by modifying the stiffness of the regions between the central portion and the mounting portions where the torsional hinged device is anchored or attached to the inertial drive source, (e.g. a piezoelectric element arrangement). The stiffness of the connecting region is modified or reduced to provide more flexibility between the mounting portions of the anchor members 14a and 14b or support frame 14 and the central portion of the anchor that is attached to the torsional hinges 18a and 18b. This allows the up and down motion of the piezoelectric elements to easily translate to rotation of the torsional hinges about their axis. More specifically, the stiffness of the connecting region central portion of the anchor is decreased to provide easier flexing of the actuators. This flexing generates the needed angular rotation at the base of the torsional hinges. More importantly this also means that the actuator requires less force to drive the device to a selected rotational angle.

Figure 2:
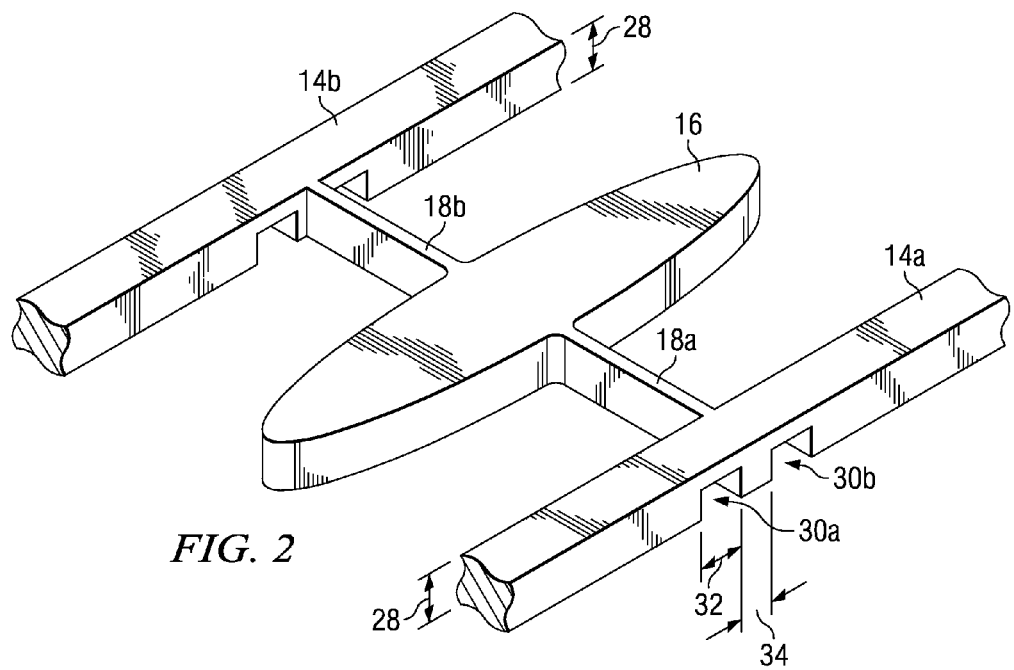
FIG. 2 is a perspective edge view and a side view of a torsional hinged mirror incorporating the teachings of the present invention.
Figure 3A:
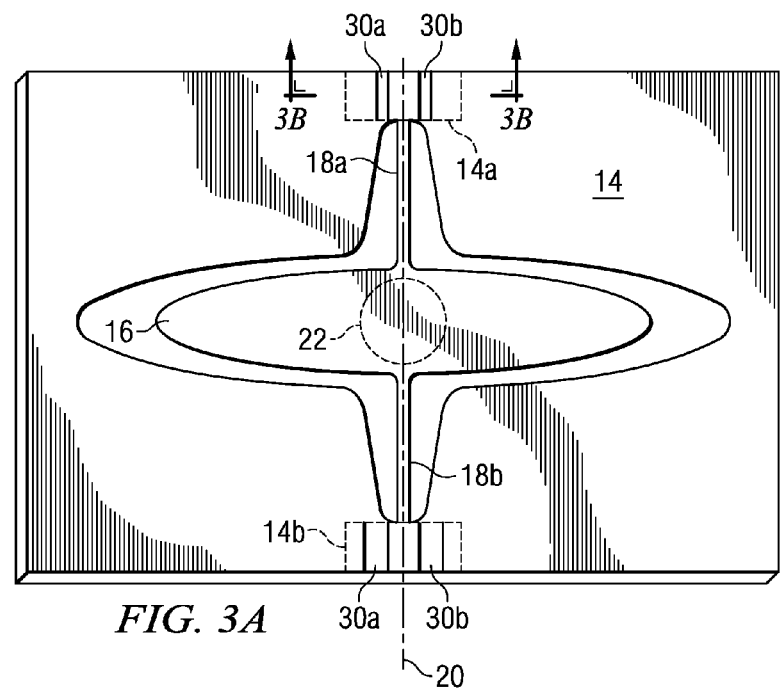
FIGS. 3A, 3B, 4A, and 4B are top views and sectional side views of the mirrors of the type shown in FIGS. 1A and 1B that have incorporated the teachings of the invention.
Figure 3B:
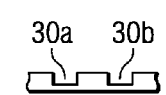
Figure 4A:
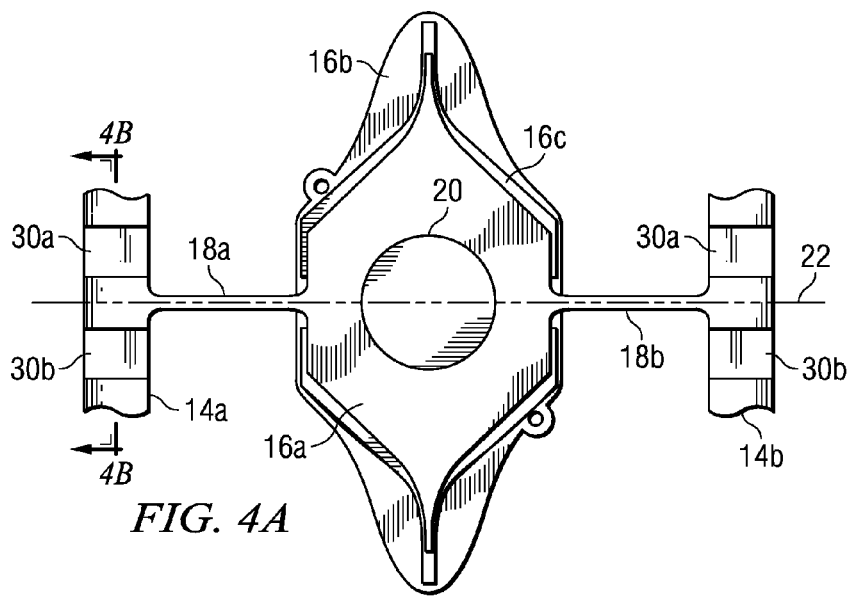
Figure 4B:
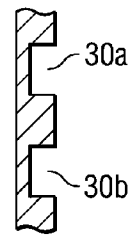

FIG. 2 is a perspective edge view of a single layered mirror similar to the prior art mirror of FIG. 1A, except it includes a reduced cross-sectional area, such as for example, a notched frame, for decreasing the stiffness (or increasing the flexibility) according to the present invention. As shown, the anchor portion 14a and 14b as well as the torsional hinges 18a and 18b are etched from silicon having a selected thickness as indicated by arrow 28. As an example only, if the thickness is 120 μm, then in the illustrated embodiment the notches or trenches 30a and 30b that reduce the cross-sectional area are etched to about 70% of the total thickness or approximately 85 μm. Also as shown in the embodiment of FIG. 2, the trenches or reduced area have a width as indicated by arrow 32. In the example, the trenches or notches have a width of about 125 μm so as to leave a central portion as indicated by arrow 34 (or as shown in the figure, about 250 μm). It should also be appreciated that the trenches that create the thinned areas may be cut from the top surface or bottom surface of the structure.

Referring now to FIGS. 3A, 3B, 4A, and 4B, there are shown a top view and partial side cross sectional views of the present invention as could be incorporated in the mirror types of FIGS. 1A and 1B.

Figure 5:
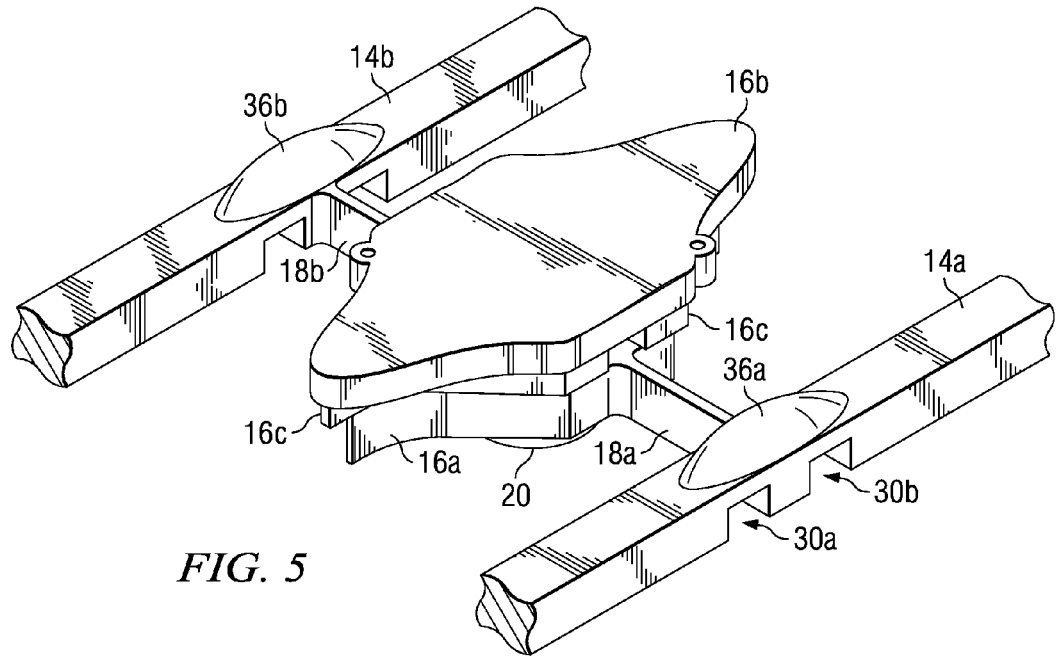
FIG. 5 is a perspective view of a resonant torsional hinged mirror that includes material added to increase the stiffness between the torsional hinges and support anchors according to the teachings of the invention.

However, as will be appreciated by those skilled in the art, although careful control of the manufacturing process in forming the torsional hinged devices can provide devices, such as mirrors, that have a resonant frequency within a reasonable range. Each device of such a group or batch of devices will likely have different resonant frequencies, including some outside of an acceptable tolerance range. Therefore, if the resonant frequency of the device could be adjusted, the yield could be significantly increased, which would in turn lower the cost. The present invention provides a simple straight forward technique for adjusting the resonant frequency of the device. As shown in FIG. 5, a quantity of material 36a and 36b is applied to the anchor members 14a and 14b on the surface of the anchor member opposite the trenches or areas of reduced thickness. The added material, such as solder or a UV curable adhesive, is of a type selected to stiffen the connection or junction region where the central portion of the anchor is attached to the mounting portion. Stiffening the connection region between the mounting portion and the central portion of the anchor member will result in an increase in the resonant frequency. Consequently, it will be appreciated that the design of the device before adding the material should be designed with a bias toward a lower frequency.

Although the present invention and its advantages have been described in detail, it should be understood that various changes, substitutions and alterations can be made herein without departing from the spirit and scope of the invention as defined by the appended claims.

Moreover, the scope of the present application is not intended to be limited to the particular embodiments of the process, machine, methods and steps described in the specification. As one of ordinary skill in the art will readily appreciate from the disclosure of the present invention, machines, methods, or steps, presently existing or later to be developed, that perform substantially the same function or achieve substantially the same result as the corresponding embodiments described herein may be utilized according to the present invention. Accordingly, the appended claims are intended to include within their scope such machines, means, methods, or steps.

What is claimed is:

1. An oscillating device having an adjusted resonant frequency comprising:
    a pair of torsional hinges, each hinge of said pair of torsional hinges lying along a pivot axis and having first and second ends;
    an oscillating device connected between said pair of torsional hinges at said first end of each hinge of said pair and oscillating at a resonant frequency;
    first and second anchor members each of said first and second anchor members having a selected thickness and including a central portion and mounting portions joined by a connecting region of reduced stiffness, said central portion of each of said anchors connected to said second ends of said pair of torsional hinges and said mounting portions of each hinge mounted to a support structure; and
    a material applied over said connecting region of said anchor members to increase the stiffness between said torsional hinges and said anchor members with a resulting increase in the resonant frequency of said device.

2. The resonant device of claim 1 wherein said device is a single layer torsional hinge mirror.

3. The resonant device of claim 1 wherein said device is a multilayered device.

4. The resonant device of claim 1 wherein said connecting region of said first and second anchor member has a smaller cross-sectional area than said central portion.

5. The resonant device of claim 4 wherein said smaller cross-sectional area is a thinned area.

6. The resonant device of claim 1 further comprising a piezoelectric element attached to an anchor member.

7. The resonant device of claim 1 wherein said applied material is a UV curable adhesive or solder.

8. The resonant device of claim 1 wherein said oscillating device is made of silicon.

* * * * *